US010382533B2

(12) United States Patent
Soon-Shiong (10) Patent No.: US 10,382,533 B2
(45) Date of Patent: *Aug. 13, 2019

(54) CAMERA-TO-CAMERA INTERACTIONS, SYSTEMS AND METHODS

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,704

(22) Filed: Jul. 20, 2018

(65) Prior Publication Data

US 2018/0352021 A1 Dec. 6, 2018

Related U.S. Application Data

(63) Continuation of application No. 14/463,360, filed on Aug. 19, 2014, now Pat. No. 10,038,740.

(60) Provisional application No. 61/867,441, filed on Aug. 19, 2013.

(51) Int. Cl.
| | | |
|---|---|---|
| G06F 17/30 | (2006.01) | |
| H04L 29/08 | (2006.01) | |
| G06F 16/783 | (2019.01) | |
| H04L 29/06 | (2006.01) | |
| H04N 21/4223 | (2011.01) | |
| H04N 21/4227 | (2011.01) | |

(52) U.S. Cl.
CPC .......... *H04L 67/10* (2013.01); *G06F 16/7837* (2019.01); *H04L 67/18* (2013.01); *H04L 67/22* (2013.01); *H04L 67/38* (2013.01); *H04N 21/4223* (2013.01); *H04N 21/4227* (2013.01)

(58) Field of Classification Search
None
See application file for complete search history.

(56) References Cited

U.S. PATENT DOCUMENTS

| | | |
|---|---|---|
| 7,016,532 B2 | 3/2006 | Boncyk et al. |
| 7,882,234 B2 | 2/2011 | Watanabe et al. |
| 8,218,873 B2 | 7/2012 | Boncyk et al. |
| 8,224,077 B2 | 7/2012 | Boncyk et al. |

(Continued)

FOREIGN PATENT DOCUMENTS

| | | |
|---|---|---|
| KR | 10-2006-0045523 A | 5/2006 |
| WO | 2004/095778 A1 | 11/2004 |

OTHER PUBLICATIONS

International Search Report and Written Opinion issued in International Application No. PCT/US2014/051706 dated Dec. 2, 2014, 8 pages.

*Primary Examiner* — Hung D Le
(74) *Attorney, Agent, or Firm* — Mauriel Kapouytian Woods LLP; Serge Krimnus; Andrew A. Noble (57) ABSTRACT

Systems and methods of delegating media capturing functionality from one device to another are presented. A first device configured with an object recognition engine captures a media representation of an environment and identifies an object within that environment. Then based on matched object traits from a database, the engine selects a delegation rules set, and delegates certain media capturing functionality to a second device according to the selected delegation rules set.

27 Claims, 2 Drawing Sheets

(56) References Cited

U.S. PATENT DOCUMENTS

| | | | |
|---|---|---|---|
| 8,224,078 | B2 | 7/2012 | Boncyk et al. |
| 8,250,218 | B2 | 8/2012 | Watanabe et al. |
| 8,350,675 | B2 | 1/2013 | Riechel |
| 8,683,054 | B1 | 3/2014 | Karakotsios et al. |
| 9,094,137 | B1 * | 7/2015 | Sehn .................... H04W 4/029 |
| 9,706,517 | B2 * | 7/2017 | Kim ..................... G01S 5/0215 |
| 10,038,740 | B2 | 7/2018 | Soon-Shiong |
| 2002/0033844 | A1 * | 3/2002 | Levy ...................... G06F 21/10 715/744 |
| 2005/0169500 | A1 | 8/2005 | Takahashi et al. |
| 2006/0136972 | A1 * | 6/2006 | Metzger ........... G08B 13/19689 725/105 |
| 2009/0046933 | A1 | 2/2009 | Gallagher et al. |
| 2011/0143779 | A1 * | 6/2011 | Rowe ..................... G06Q 30/02 455/456.3 |
| 2012/0011148 | A1 | 1/2012 | Rathus et al. |
| 2012/0239923 | A1 | 9/2012 | Karl et al. |
| 2012/0243730 | A1 * | 9/2012 | Outtagarts ......... G06K 9/00771 382/103 |
| 2012/0249802 | A1 | 10/2012 | Taylor |
| 2013/0120596 | A1 | 5/2013 | Yau |
| 2013/0128059 | A1 | 5/2013 | Kristensson |
| 2013/0275441 | A1 * | 10/2013 | Agrawal ........... G06F 17/30616 707/749 |
| 2014/0003654 | A1 * | 1/2014 | Beaurepaire ....... G06K 9/00664 382/103 |
| 2015/0052146 | A1 * | 2/2015 | Soon-Shiong ...... G06F 16/7837 707/740 |

\* cited by examiner

CAMERA-TO-CAMERA INTERACTIONS, SYSTEMS AND METHODS

This application is a continuation of U.S. application Ser. No. 14/463,360 filed Aug. 19, 2014, which claims the benefit of priority to U.S. provisional application 61/867,441 filed Aug. 19, 2013. This and all other extrinsic references referenced herein are incorporated by reference in their entirety.

FIELD OF THE INVENTION

The field of the invention is distributed media capture technologies.

BACKGROUND

The following description includes information that may be useful in understanding the present invention. It is not an admission that any of the information provided herein is prior art or relevant to the presently claimed invention, or that any publication specifically or implicitly referenced is prior art.

With the advancement of wireless network technology such as WiFi network routing, WiFi hot spots, 4G/IMT-Advanced standards, 5G mobile wireless communication standards, and WiGiG, connectivity among devices has become cheaper, faster, more convenient, and universal. With wireless technology progress in conjunction with the development of multi-faceted devices such as smart phones, tablets, and Google Glass®, multi-device systems involving cameras have been developed to communicate and coordinate actions to increase efficiency. However, known systems have yet to delegate media capturing functionality from one device to another based upon object recognition or other contextual information.

Previous efforts applied toward device coordination include U.S. Pat. No. 8,250,218 to Watanabe et al. "Wireless Communication System, and Wireless Communication Device and Control Method for Establishing a One-to-One Relationship Between Wireless Communication Devices", filed Dec. 14, 2010, which describes a wireless network that allows cameras and printers to coordinate actions within a small time period. Although Watanabe et al. provides insight into wireless network communication by a camera, it does not employ object recognition by the camera, nor does it delegate media capturing functionality.

Further progress in device coordination effort is made by U.S. patent application publication 2013/0120596 filed Nov. 15, 2011 to Yau titled "Method of Configuring a Wireless Network Camera Wirelessly." Yau describes a method for allowing a camera to function as a hotspot, through which a cell phone controls a camera. Although Yau provides insight into wirelessly controlling a camera, it does not do so using object recognition to trigger delegation of responsibilities from one media capturing device to another.

Some effort has been directed to camera-to-camera coordination. For example, U.S. patent application publication 2012/0249802 filed Dec. 1, 2011 to Taylor titled "Distributed Target Tracking Using Self Localizing Smart Camera Networks" describes a method for determining locations of cameras based on each camera tracking an object, then triangulating the location of the object. Although Taylor provides insight into coordinating behaviors among a system of cameras, the system's devices do not delegate their functionality o responsibilities to other devices based on recognition.

Ideally, a user should be able to interact with one device while it automatically delegates media capturing functions to other devices. In such environments, the user will be able to do so automatically based upon contextual relevance of certain objects within an environment as described below in the applicant's work.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a system in which a media capturing device delegates some of its functionality to a second media capturing device based on object recognition.

SUMMARY OF THE INVENTION

The inventive subject matter provides apparatus, systems and methods in which one can use a media capturing device to assign appropriate functionalities or responsibilities to another device based on recognizing one or more objects in an environment. One aspect of the inventive subject matter includes a coordinated multi-device system having an object database, a rules database, and at least one media capturing device. The media capturing device is configured to obtain a variety of digital media types including pictures, multimedia, audio, or other types of digital media modalities. The media capturing device operating as an recognition engine executes one or more data processing algorithms to extract characteristics from the media. The characteristics can be used to query an object database storing object traits associated with known objects. The object traits aid in determining the nature of contextually relevant items represented within the captured media. The object database can store object traits as various types of recognition characteristics, possibly as descriptors (e.g. shape context descriptors, filter-based descriptors, distribution-based descriptors, textons, derivative-based descriptors, etc.). Depending on the particular object identified or otherwise observed, the media capturing device selects delegation rules set from the rules database as a function of the object traits. The delegation rules set and its associated rules dictate which media capture functionalities or responsibilities could or should be delegated to at least one other, different device. Thus, based on object recognition, one device could delegate the storage, capture, setting adjustment, or other device media capture functionality to a second device.

Another aspect of the inventive subject matter includes a method of delegating media capturing functionality or responsibilities. Contemplated methods include operating a device to capture a media representation (e.g., image data, video data, audio data, biometric data, etc.) of an environment (e.g., real-world scene, a room, a virtual setting, etc.) and allowing the device to access an object recognition engine. The method further includes the object recognition engine identifying an object from the captured digital representation using one or more characteristics derived from the digital representation. The characteristics are then used to obtain object traits stored in an object database. The object recognition engine selects and executes a delegation rules set to coordinate actions of a second device that might be performed contingent upon the object identified or the object traits. Preferably, the distribution of responsibilities among devices occurs over a wireless connection. For example, the method can include a user operating a handheld camera (i.e., not their smart phone). When a recognizable object is within the camera's view, the camera automatically triggers the user's smart phone, transmitting the image to the smart phone for storage in near real time.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, AMD® Althon, Intel® Core i7, GPU, Nvidia® Tesla, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media (e.g., DVD, memory, FLASH, thumb drive, ROM, etc.) storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
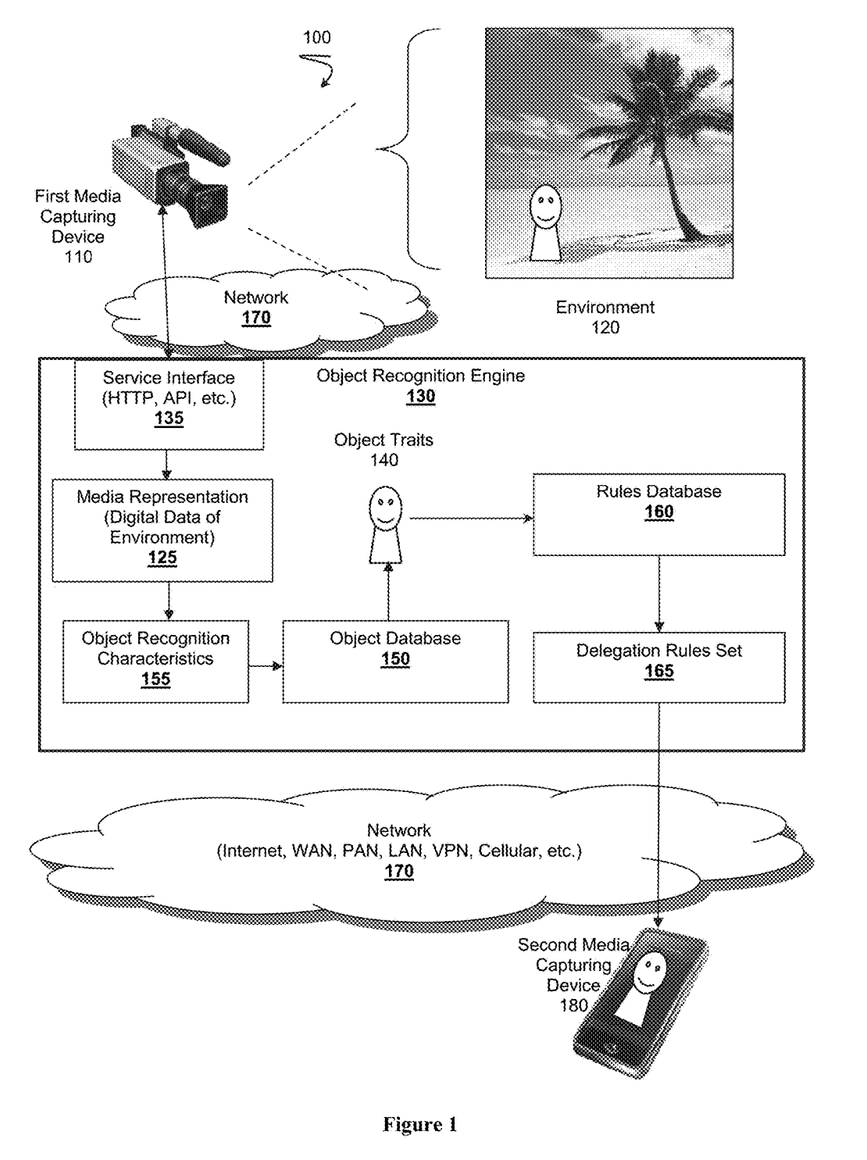
FIG. 1 illustrates a schematic for a multi-device media capturing functionality delegation system.

FIG. 1 illustrates a coordinated multi-device media capturing functionality delegation system 100 comprising an object recognition engine 130 configured to or programmed to delegate media capturing functionality from a first media capturing device 110 to a second media capturing device 180 based on recognizing one or more objects in environment 120. Examples of computing platforms that can be suitably adapted for use with the inventive subject matter within the device include those based on Linux, Mac OS, Microsoft, Solaris, Android, BlackBerry OS, iOS, Embedded Linux, Palm OS, WebOS, Windows Mobile, VxWorks, or other suitable computing platforms that can run object recognition engines. It should be appreciated environment 120 could include one or more of the following: a nature setting, a building, a room, an operating room, a street, a stage, a vehicle, a road, an operating room, a school, a classroom, an arena, a stadium, a warehouse, a mall, a plaza, a neighborhood, an office, an ecosystem, infrastructure, a habitat, a scene, a live performance, a sporting event, a virtual setting, or other type of setting. For example, a virtual environment could include a virtual world, an augmented reality, a game, on-screen content, broadcast programming, a mixed reality, or other rendered environment.

The following discussion describes object recognition engine 130 as delegating media capturing functionality or responsibilities to a second media capturing device 180 (e.g., same type of device or different device) over a network 170. In some embodiments, object recognition engine 130 comprises one or more servers possibly operating as a Platform-as-a-Service (PaaS), Infrastructure-as-a-Service (IaaS), Software-as-a-Service (SaaS), or other type of platform. For example, object recognition engine 130 can offer its services via a web-based API (e.g., SOAP, WSDL, REST, etc.) via service interface 135. Still, one should appreciate that object recognition engine 130 can represent a variety of suitably configured devices including cell phones, personal computers, tablets, phablets, kiosks, vehicles, appliances, game consoles, or other devices. In some embodiments, a user can install an application on their smart phone where the application programs or configures the cell phone to operate as object recognition engine 130. An application that could be suitably adapted for use with the inventive subject matter include the iD Browser™ recognition platform provided (see URL www.idbrowser.com). Rather than merely returning content information about an object, the iD Browser can be configured to issue commands to other devices.

In the example shown, a user of first media capturing device 110 in environment 120 captures media representation 125 that comprises digital data representing environment 120. As a more specific example consider a person attending a concert. The individual at the concert could use a cell phone to record an audio sample of a currently playing song. The audio data captured by device 110 at the concert can be submitted to object recognition engine 130 possibly over network 170 (e.g., network connection, Internet, LAN, WAN, VPN, PAN, etc.) or other communication channel. Although the example shown illustrates that device 110 is a video camera, it should be appreciated that other types of sensing or computing devices could also fulfill the roles of media capturing device 110. Examples of other types of device can include a camera, a webcam, an audio recorder, a scanner, a mobile phone, a telescope, digital binoculars, digital eye glasses, Google Glass®, a smart phone, a biometric sensor, a computer, a printer, a tablet, a medical device, a kiosk, a game console, a vehicle, a phablet, or other type of sensing device.

Environment 120 can represent a real-world environment or a virtual environment. A real environment can be comprised of natural and/or artificial physical, real-world elements. A real-world environment 120 could include people, vehicles, buildings, products, or other things that exist in the physical world; seen or unseen. A virtual environment can be comprised of a digital or computer generated constructs that might or might not overlap the real-world. Example virtual environments can include virtual reality settings, augmented reality settings, immersion environments, projected holograms, rendered gaming worlds, or other types of digitally managed scenes. In such a case, environment 120 might represent a video game, an animation, computer modeling environment, or other type of environment having objects that are at least partially rendered by a computer.

In view that environment 120 can include a wide variety of objects, media representation 125 can also include a broad spectrum of data modalities to represent environment 120 and its associated elements. Example data modalities could include one or more of image data, video data, audio data, speech data, motion data, acceleration data, temperature data, text data, biometric data, game data, radio data, webpage data, telecommunication data, satellite data, sensor data, ultrasonic data, x-ray data, Mill data, CT scan data, or other modalities. In the example shown, media representation 125 includes image data representing objects in environment 120.

Object recognition engine 130 is configured to or programmed to obtain media representative of an environment 120 over service interface 135 (e.g. cellular interface, GUI, API, HTTP server, memory access, etc.). For example, capturing device 110 can package media representation 125 as digital data packets that could be sent via HTTP to recognition engine 130. Media representation 125 could comprise raw data, files, streamed data, compressed data (e.g., zip files, PNG images, JPG images, etc.), encoded data (e.g., MPEG4, etc.), or other types of digital data.

It is further contemplated that the media representation 125 can contain three-dimensional content (e.g., time varying images, 3D object information of an object, etc.). As such, the first media capturing device 110 can comprise multiple media capturing sensors; perhaps a surveillance system. Each device captures a media representation that, in conjunction with other captured media representations, can form 3D content or a 3D model through multi-image 3D reconstruction. It is also contemplated that the first media capturing device 110 can install a suitably configured 3D reconstruction application (e.g. Make3D, AutoDesk® 123d®, etc.) to receive images and construct the 3D content used as media representation 125.

Object recognition engine 130 identifies or recognizes at least one object in environment 120 from the media representation 125 through one or more techniques. In some embodiments, object recognition engine 130 executes one or more characteristic detection algorithms on media representation 125, which yield characteristics of the media presentation 125. For example, an implementation of Scale Invariant Feature Transform (SIFT) could execute on an image. SIFT generates descriptors, typically 128-byte vector, representing characteristics or features within the image data. Such characteristics can be used to search object database 150 to identify known objects that are indexed according to similar features. To continue the SIFT example, object database 150 could comprise a tree (e.g., kd tree, spill tree, etc.) organized based on the SIFT descriptors of known objects. Upon submission of SIFT descriptors as a query, object database 150 consults the nodes of the tree to identify known descriptors having values that are closest to the observed descriptors. The known descriptors representing nearest neighbors of the observed descriptors can then indicate which known object seems to be similar to the observed object. Other algorithms could include those based on FAST, BRISK, optical character recognition (OCR), automatic speech recognition (ASR), support vector machines for classification of characteristics, edge detectors (e.g., Canny edges, etc.), or other algorithm. It should be appreciated that the algorithms execute on digital media representation 125 should align with the particular modality of the data. Object database 150 could also be a file system, local database, or even a remote database.

Object recognition engine 130 obtains object recognition characteristics 155 from execution of the various algorithms.

In more preferred embodiments, object database 150 storing object traits or other known object information that are indexed according to indices within the same representation space as object recognition characteristics 155. Thus, one or more objects in the scene 120 can be identified or recognized by submitting a query derived from object recognition characteristics 155 to object database 150. The characteristics can be stored as descriptors as referenced above for example. Objects could comprise nearly any type of entity, possibly including a tangible entity, an intangible entity, a virtual entity, an inanimate entity, an animate entity, or other type of object.

In the example, shown object database 150 is shown as being external to media capturing device 110. It is also contemplated that the object database 150 can be stored within a memory of first media capturing device 110. Alternatively and more aligned with FIG. 1, object database 150 can reside on a cloud server or other network accessible external device. In some embodiments, multiple object databases will reside on a server or device and be accessible by the first media capturing device upon proper authentication. Example techniques for recognizing objects within a digital representation that can be suitably adapted for use within the inventive subject matter includes those described in co-owned U.S. Pat. Nos. 7,016,532; 8,224,077; 8,224,078; and 8,218,873.

Object database 150 is configured or programmed to store object traits 140 associated with known objects and indexed by recognition characteristics of the known objects. Object traits 140 can be consider a collection of attributes, attribute-value pairs, or other data representing a corresponding known object. For example, if the known object represents a television program or a commercial, object traits could include attributes that indicate a broadcast time, broadcast location, characters, product names, or other elements. It should be appreciated that object traits 150 can include a wide variety of traits that describe the corresponding known object, possibly including a physical trait, an emotional trait, a mental trait, a visual trait, a virtual trait, an audible trait, a behavior trait, a thermal trait, a textural trait, a scent trait, a taste trait, a chemical trait, a size or shape trait, a radioactive trait, a toxic trait, an energy trait, a biological trait, a biometric trait, a medical/health trait, a derived trait, a geographic trait, a digital rights trait, or other type of trait.

Object traits 140 can be considered to represent an inferred nature of an observed object in environment 120. Once recognition engine 130 has an understanding of the nature of the observed object, it is able to determine how best to capture additional information about the observed object or environment 120.

Of specific interest, recognition engine 130 can delegate one or more media capturing functionalities, roles, or responsibilities to second media capturing device 180 based on the nature of the observed object, perhaps based on one or more dimension of relevance with respect to the recognized object. Consider a scenario where device 110 captures an image of on-screen television content (e.g., time varying 2D content). Upon recognition of the content as time varying 2D content as object trait(s) 140, device 110 can delegate its responsibility of recording audio to a set top box or cell phone because delegation rules 165 indicate that audio, an additional dimension of relevance, should be captured by a more suitable device. Alternatively, device 110 might recognize a 3D object based on a 2D image. Based on recognition of the 3D object, the corresponding delegation rules 165 set might instruct device 110 to command other nearby image capturing devices to capture alternative 2D images from other view points of the object, thus providing for construction of a 3D model of the object. One should appreciated that the inventive subject matter is considered to include delegation of media capturing functionality based on the dimensions or relevance related to an object, or include increasing or decreasing the dimensions (e.g., width, depth, height, modalities, etc.) of captured content related to the object.

Object recognition engine 130 selects a delegation rules set from a rules database 160 as a function of the object traits 140. Rules database 160 is configured to store at least one delegation rule set indexed according to at least some of object traits. For example, rules database 160 can be indexed by attributes adhering to the same namespace to which object traits 140 adheres. Thus, object traits 140 could be compiled into a query and submitted to rules database 160. In response, rules database 160 returns a result sets having zero (a NULL set) or more delegation rules sets 165, perhaps ranked by how well each rules set satisfies the query. Rules database 160 could also be a file system, local database, or even a remote database. In some embodiments, rules database 160 could be implemented as part of object database 150. For example, object database 150 could return object-specific links to delegation rules sets 165 (e.g., URLs, URIs, network address, file handles, etc.).

Delegation rules set 165 can be considered a set of executable device instructions, commands, or rules by which the commands could, or should, be executed by the delegate. Example commands could include a performance command, a performance adjustment command, a stop command, a device setting adjustment, the second media capturing device's identity, a time shift command, a configuration parameter, a timing command, a triggering command, a play command, a relay command, an acknowledgement protocol, a processing command, an object identification command, a negative acknowledgement protocol, an authentication key, or type of command.

The commands can comprise actual device commands (e.g., low level object code, compiled code, etc.) or higher level application commands (e.g., API calls, etc.) depending the nature of the media capturing device 180. For example, in embodiments where media capturing device 180 comprises a "dumb" device or sensor, perhaps a USB camera, the device commands might comprise binary commands sent to the sensor's USB ID. In other embodiments where the device 180 represents a computing device (e.g., a cell phone, set top box, etc.), the device commands could include high level scripts. Recognition engine 130 can package the commands and other aspects of delegation rules set 165 for delivery over network 170. Delegation rules set 165 could be sent as binary data, serialized text (e.g., HTTP, SOAP, XML, JSON, YAML, etc.), or other technique.

The object recognition engine 130 delegates at least some media capturing functionality from the first media device 110 to second media capturing device 180 according to the delegation rules set 165. Recognition-based delegation of media capturing functionality has numerous advantages. Consider a scenario where a person captures a video of popular idol in a public space via their smart phone. Their smart phone can be provisioned with an instance of recognition engine 130. In response to the video, the user's smart phone recognizes the idol and builds delegation rules set 165 based on the traits of the idol (e.g., name, location, date, etc.). The rules set can instruct members of the user's social network of the event and, if the friends of the user are nearby, instruct their devices to also capture images or audio of the event. This allows for a coordinated experience of friends. The devices of the friends could be similar to the user's device or could be other types of devices.

Consider a case where first media capturing device 110 lacks or loses a specific media capturing capability. Perhaps first media capturing device 110 that has run out of memory storage space and is no longer able to store image data. Device 110 can then delegate image storage functionality to a second media capturing device 180 so that device 180 stores an image file captured by the first media capturing device 110. One should appreciate that the first media capturing device 110 and object recognition engine 130 could be the same device (e.g., AR-glasses). Alternatively, the object recognition engine 130 could be the same device as the second media capturing device 180 (e.g., a cell phone). However, the first and second media capturing devices are distinct devices (e.g., AR glasses and a cell phone). An astute reader will appreciate that the disclosed techniques would have great advantages in personal area networks (PANs) where a device in a PAN could distribute data capturing functionality among other devices in the PAN in direct response to a observed state of environment 120.

It is additionally contemplated that the first media capturing device 110 can delegate media capturing functionality to a second media capturing device 180 that does not have the delegated functional capability. The first media capturing device 110 can communicate a script or set of commands, or send instructions for the second media capturing device 180 to download and execute. In this case, delegation rules set 165 comprises new code that enables media capturing device 180 to execute new functionality, subject to hardware support. For example, both devices could have a shell environment supporting Python, Ruby, Lua, Java, or other language execution run-time. Delegation rules set 165 could include new modules or functions that enhance the capabilities of device 180. Assuming for the moment the device 180 includes a CCD camera, delegation rules set 165 might include a new image filter for the image data captured by the CCD camera.

It is further contemplated that the delegated media capturing functionality can be communicated to the second media capturing device 180 over any suitable network 170 including an ad hoc network, a peer-to-peer network, a personal area network, a wireless network, a local area network, a wide area network, metropolitan area network, server area network, system area network, campus area network, mesh network, cellular network, desk area network, or other type of network.

One should appreciate that first media capturing device 110 can be communicatively coupled to multiple second media capturing devices 180 and delegate multiple media processing functionalities (e.g., data capturing, data processing, image processing, object recognition, transaction engagement, etc.) among the external devices according to the rules set 165. As an example consider embodiment where a person wearing a camera-enabled glasses (e.g., Google Glass, Baidu Eye, etc.) captures recorded images, possibly as a video feed. The processor within the glasses can analyze the context of the person or the content of images to determine, which, if any media processing responsibilities or functionality should be delegated to other devices. Perhaps as the person enters a specific store as identified by GPS coordinates, the glasses can delegate object recognition processing to the person's cell phone by configuring the cell phone to recognize store products based on the captured image data. In response to the delegation, the glasses can transmit portions of the captured images (e.g., selected video frames, segments of the images, etc.) to the person's cell phone in the person's pocket, which then operates as a recognition engine to identify objects represented in the image data. Delegation of the media processing responsibilities could be triggered by other contextual events possibly including recognition of an object, a user voice command, user input on a locally connected different device, news event, or other trigger.

The previous example of a camera-enabled glass should not be considered limiting. Rather, the initial capturing device (e.g., media capturing device 110) could be nearly any data capturing device within personal area network, possibly including a biosensor, smart watch, a wrist band, tablet, or other device. An astute reader will further appreciate that there is no need for a user to initiate delegation of media processing functionality. In fact, the disclosed ecosystem can operate autonomously by using ambient, recognition-based contextual triggers related to observed objects to initiate recognition activities or other processing responsibilities among local devices without direct user commands.

The first media capturing device 110 can also be configured to receive an acknowledgement (ACK) protocol or negative acknowledgement (NAK) protocol upon delegation. It should further be appreciated that the second media capturing device 180 can relay the delegated media capturing functionality, acknowledge or not acknowledge the delegation, or require authentication prior to performing the delegated media capturing functionality.

Figure 2:
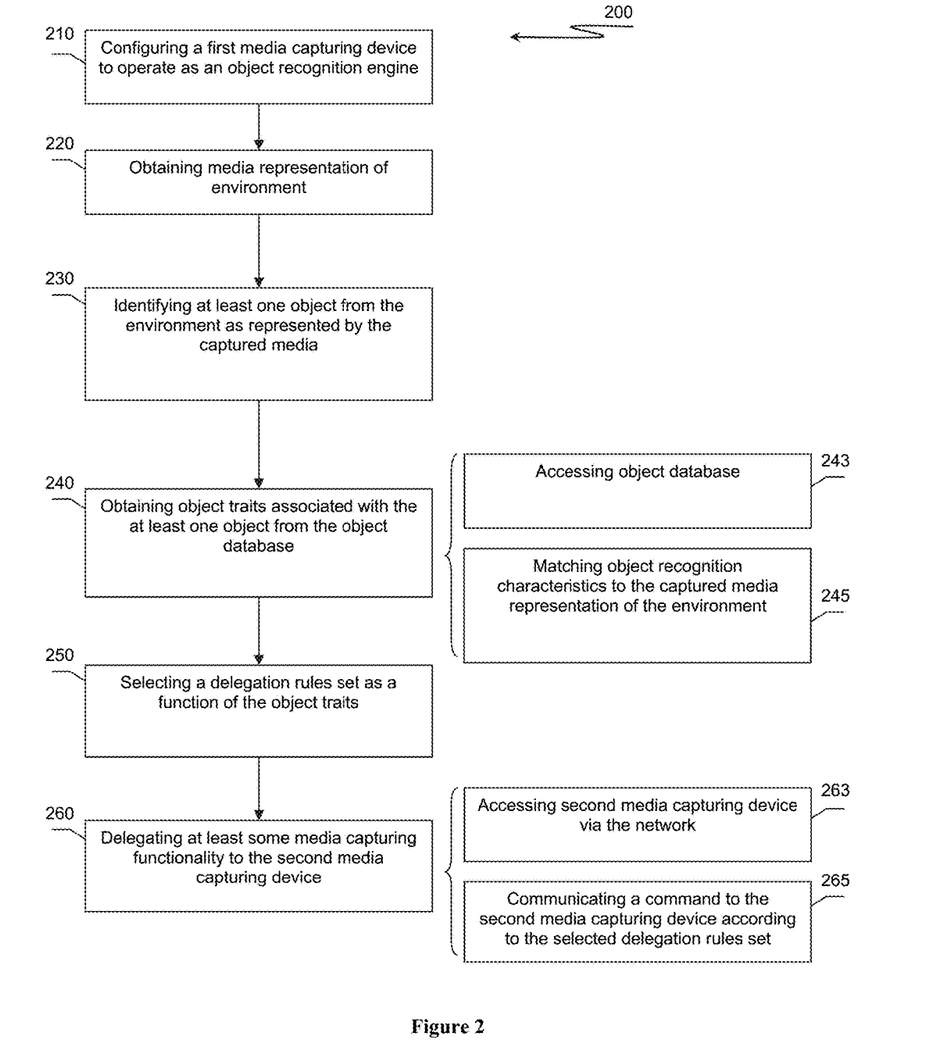
FIG. 2 presents a possible method for delegating media capture functionality from one device to another based on object recognition.

FIG. 2 presents method 200 of delegating media capturing functionality to a second media capturing device 180 based on object recognition. It should be appreciated that both the delegation and object recognition activities could be contingent on a user command and performed by separate suitably configured modules. For example, upon recognizing an object associated with a delegation rule, first media capturing device 110 can request a user's approval to proceed with delegation.

Step 210 includes configuring a first media capturing device to operate as an object recognition engine. The device can be configured through installation of one or more sets of software instructions (e.g., applications, software, apps, etc.) within the non-transitory, computer readable memory of the device where the instructions cause the device's processor to execute the various steps of method 200.

For example, a cell phone can be configured to operate as an object recognition engine by installing a suitably configured object recognition application on the cell phone (e.g., appearance-based recognition methods, feature-based recognition methods, sound-based recognition methods, Android Eye, Google Picasa®, LookTel®, oMoby®, Kudan®, etc.). In other embodiments, a user might use their personal computing device to engage a remote server operating as a for-free recognition service. A suitable app that could be adapted for use as a recognition engine includes the iD Browser® platform (see URL www.idbrowser.com). iD Browser is able to recognize known objects based on audio or image data, but lacks delegation rules. iD Browser could include an additional rules database through which one or more delegation rules sets could be obtained.

Configuring the device can also include integrating one or more object databases and one or more rules databases into the first media capturing device. The rules database and object database can reside in the first media capturing device 110's internal memory for example. This approach provides for application-specific settings as the internal memory of smart phone might be limited. Still, it should be appreciated that the various databases discussed herein could be located externally to the media capturing device, perhaps available over a network; the Internet for example. For example, public search engines (e.g., Google®, Yahoo! ®, Bing®, etc.) could be enhanced to indexed delegation rules sets for known objects. The media capturing device could simply submit a captured image to the search engine. In response, the search engine compiles delegation rules sets that can be sent to the device or other devices.

Step 220 includes obtaining a media representation of the environment by the recognition engine. The media representation comprises digital data that represents one or more sensed modalities of an environment as discussed previously, typically acquired through sensors (e.g., biosensors, CCD cameras, CMOS cameras, microphone, Kinect® sensor, etc.). The recognition engine can obtain the media representation through numerous techniques. For example, the media capturing device operating as the recognition engine can directly obtain the media representation from one or more sensors, perhaps in a scenario where the target sensor is integrated into the media capturing device. In other embodiments, the recognition engine can obtain the media representation from a remote sensor or even a remote media capturing device. In such a case, the media representation can be packaged as a file or stream of digital data. The file or data can be obtained over a network through one or more protocols (e.g., FTP, HTTP, SMTP, SMS, MMS, etc.).

Step 230 includes identifying at least one object from the environment as represented by the captured media. The method for identification is contingent upon the modality of the media representation environment 125 and employs execution of one or more identification algorithms using the media representation as input. For example, video data can be analyzed for audio signatures. Further, image processing algorithms can execute on the video data to derive image features on a frame by frame basis. Features might include FAST corner, descriptors, edges, text, or other types of features. Even further, one or more activity recognition algorithms (e.g., directed acyclic graphs, etc.) can be executed on the frames of the video data to identify actions. The resulting features, signature, descriptors, or other characteristics can be used as a query submitted to a known object database. The known object database indexes information about known objects based on the characteristics. Thus, object information could be indexed according to a schema that adheres to the various modalities' characteristic space. As referenced previously, co-owned U.S. Pat. Nos. 7,016,532; 8,224,077; 8,224,078; and 8,218,873 offer all appropriate techniques for identifying objects and can be adapted for use for object identification or recognition.

In response to submission of the media representation characteristics to the object database, the object database returns a results set of object information. The object information could include a myriad of types of object information related to the corresponding object. The object information could include address of content data, object classification or categorization, application data, executable code, video data, audio data, music, text, forms, healthcare data, or other types of data. Of specific interest, the object information can include object traits related to the corresponding known object or known object class. The object traits describe the nature of the known object and provide insight into how multiple devices can observe the known object.

Step 240 includes obtaining the object traits associated with at least one object from the object database if such object information is in the object database. In one embodiment, the object recognition engine accesses the object database (step 243), matching the indexed object recognition traits with the identified object (step 245).

The object traits could include specific object information such as name, identifier, type, location, colors, or other attributes. Further, the object traits can also include metadata about the known objects. The metadata can include specific media capturing information such as preferred audio capturing techniques, data filters, preferred algorithms for recognition or tracking, digital rights information, or other types of metadata data. Consider a scenario where a doll or other toy (e.g., a Disney® princess doll, Pixar® character, etc.) has an accompanying app allowing a child and their friends to interact with the doll all together via their devices (e.g., tablets, etc.). The doll owner's device operating as the recognition engine recognizes the doll and receives object traits related to the doll. The traits can include the doll's name or other information, which can be transferred to the friends' devices. Further, the object traits can indicate that the doll is silent, thus the audio media capturing functionality for all the devices are set to NULL. However, the object traits relating to other modalities might not be NULL. The traits including descriptions that could be leveraged to also instruct the friends' device to capture additional video data of the doll or the doll's environment. The additional video data captured by all the devices allow the apps on the device to improve the experience of the children, perhaps through improved feature tracking, modeling the environment, anchoring augmented reality content, or other aspects.

Step 250 includes selecting a delegation rules set as a function of the obtained object traits. Delegation rules sets can be considered collections of conditions or requirements under which one or more media capturing functionality should be delegated to other devices. It should be appreciate that the media capturing functionalities represent device actions that are executed with respect to sensing an environment. Each rules set comprises criteria for issuing media capturing device commands to other devices where the criteria are defined as a function of object traits. The criteria can include absolute requirements, optional conditions, or threshold factors. Consider a scenario where a person captures video on their smart phone at a sporting event. Once the system recognizes a sports team or logos, the person's smart phone operating as the recognition engine obtains a delegation rules set. The rules sets can be selected based on object traits such as geographic location, geographic zones, time, duration, type of device(s), or other type of trait. The rules set might include requirements that the person be located within a geo-fenced area (geographic location or geographic zone requirement) around the arena before delegation begins due to digital right requirements associated with the object traits. The rules set also might include a threshold condition for audio. If the audio is too noisy at the location of the person (a condition or threshold), the rules set might indicate that audio capture should occur by a friend's device located closer to the point of interest.

The delegation rules set can also be stored in a delegation rules database where the rules sets are indexed according to the namespace of the object traits, including if the object traits are homogenous or a heterogeneous mix of traits. Such an approach is considered advantageous because it allows entities that manage known objects to define rules by which they want consumers to experience their objects. Thus, brand managers can define how users interact with their brands and to manage the digital rights associated with the brands (e.g., logos, products, etc.). The delegation rules set can be integrated within the media capturing device via an application, perhaps as part of a product-specific or application-specific module. In other embodiments, the delegation rules set can be accessed as a service over a network. Should the delegation rules database return more than one rules set, a user selection (e.g., remote manager, owner of device, etc.) can be used to select which rules set is most relevant. Further, the user could provide specific instructions to clarify the parameters of the rules set (e.g., accept charges due to digital rights, assign functionality to specific devices, etc.).

Step 260 includes the recognition engine delegating at least some media capturing functionality to the second media capturing device according the selected delegation rules set. The recognition engine executes commands within the delegation rules set according to the delegation criteria. For each relevant identified media capturing functionality (e.g., commands, instructions, code, etc.), the recognition engine communicates the associated commands and their associated criteria with one or more other media capturing devices (step 265). Example functionality can include capturing an image, capturing a video, capturing audio, directing an orientation for media capture, adjusting a media capturing setting, instructing document creation based upon second media capture, and requiring a media file format. For example, the recognition engine might package the following video capture instructions to a remote person's cell phone as an XML data stream over a network (step 263):

<Point of Interest Coordinates>: Location where the point of interest is, which can be translated by cell point into a direction;
<Object Characteristics>: The recognition or tracking features of object at point of interest;
<Video::Yes>: Type of functionality to be employed;
<Audio::Yes>: Capture audio track as well; and
<Time::Duration>: The time or duration that the video should be captured.

The person's cell phone can then translate the packaged information into local device instructions. For example, the Point of Interest coordinates can be translated into relative location with respect to the remote cell phone's location. The remote cell phone can then present indicators on the display screen showing where the point of interest is relative to the direction of the cell phone. In response to observing the indicators, the user can then move the position or orientation of the cell phone until the point of interest is in the field of view. Further, the phone could "lock on" to an object at the observed location based on the object characteristics passed to it.

The exchange of such data among the media capturing devices can occur over a network possibly forming a network fabric among the devices. Example networks could include an ad hoc network, a peer-to-peer network, a personal area network, a wireless network, a local area network, a wide area network, metropolitan area network, server area network, system area network, campus area network, desk area network, or other type of network. Thus, the media capturing devices can communicate directly with each other, or could communicate indirectly with each other through an intermediary delegation service. For example, it some embodiments, existing social networks could operate as a hub through which registered devices could coordinate their media capturing capabilities (e.g., Facebook®, Instagram®, Pintrest®, LinkedIn®, etc.).

It is further contemplated that the first and second media capturing devices can be in constant bidirectional communication, possibly in a delegation negotiation, with each other where the first media capturing device delegates a capturing command to the second media capturing device that subsequently sends the media back to the first media capturing device to perform object recognition. With respect to negotiations, each device in the ecosystem can report back its ability to fulfill the request for taking on the responsibilities of capturing media. For example, a device might have a full buffer and no longer be able to continue capturing media, which can be reported back to the delegating device. In response, the delegating device can reassign the responsibility to another, more capable device.

The media capturing devices are represented as sensing device, still the inventive subject matter is also considered to include delegating functionality to other suitably configured devices within the ecosystem. One especially interesting device could include a computing device sized and dimensioned to have similar dimensions of a credit card so that it fits in a wallet or purse. The card computing device can comprises a wireless interface (e.g., low power Bluetooth, Zigbee, low power WiFi Direct, etc.) through which it can interact with media capturing devices. The card computing device can be configured to provide many additional capabilities to the other devices. One possible example includes a card operating as a memory storage device for archiving media data. Should a device determine that it should delegate storage capabilities; the device could delegate storage of media to the card device. Additional functionality that could be supported by such card device can include computation, accelerometery, interfacing to external networks, database access, security, monitoring personal area network, logging activities, or other types of functionalities or responsibilities.

The following examples provide market additional context for the disclosed inventive subject. Each of the examples can be considered possible embodiments.

As an example, consider a security surveillance system comprising multiple moveable video cameras. Each camera can be configured to recognize people from a media representation. Based on a database comprising behavior characteristics of criminals and recognition characteristics of objects normally associated with crimes or inappropriate activity, each camera can command other cameras in the vicinity to point in the direction of suspicious behavior. As a result, the security system will automatically provide monitoring security guards multiple viewpoints of suspicious activities prior to determining how to respond for verification purposes. The trigging condition could be based on a recognized person or an identified action.

Consider an example within the context of online shopping. Based on a downloaded video or picture of clothing products, an object recognition engine operating as part of a browser or the browsing computer can identify the pieces of clothing. Then, based on recognition characteristics and retrieved object traits, the engine selects a delegation rules set based upon the type of clothing of interest. The delegation rules set dictates which stores within a predetermined area would likely carry that particular item. Subsequently, the object recognition engine commands a camera in that store (e.g., an employee's smart phone, store web cam, etc.) to take a picture of the article of clothing within the store and relay such depiction back to the online shopper. Such an approach provides the online shopper with a visual determination of whether a store has an product in stock for immediate purchase or even to directly observe and pre-purchase the product.

Consider another shopping context when a client is physically present in a store. Sometimes a shopper will come across an attractive item, but the particularly desired item's size, color, etc. is not on display or has all been sold within the store's show room. Instead of waiting for an employee's help to check the backroom stock or warehouse, it is contemplated that a customer can download a phone app with an object recognition engine that identifies that store's products. Upon taking a picture of an item, its barcode, price tag or other representation and inputting the particular characteristics desired, the engine can select a delegation rules set, which will command a stockroom or warehouse room camera to take a picture of where that particular item should be stored and relay it to the customer. Depending on the customer's satisfaction with the image relayed, appropriate actions can then be taken.

Another example includes monitoring or reporting traffic and identifying traffic accidents. Traffic monitoring entities can set up cameras periodically across a highway. When one camera identifies an automobile with a slow moving traffic characteristic, the selected delegation rules set can change the video feed source to the next camera closer to the perceived traffic source. These steps can be repeated to create an automated system of identifying sources of traffic congestion. Further, the delegation rules set could instruct drivers' cell phones to begin capturing motion data (e.g., accelerometery, heading, etc.) to monitor the traffic flow. In such a setting, the drivers would likely be members of a participating group or network of registered devices.

Another example includes webinars or video conferences. If not manually operated, cameras capturing and broadcasting video conferences should be zoomed out to accommodate the presenter's movements. This can make visual aids and the presenter difficult to see and hear. Instead, a first camera recording and broadcasting the presentation can have an object recognition engine to identify the speaker/presenter. When the presenter moves outside of the camera's field of view, the engine's rule database can be configured to delegate video recording of the presentation to another camera better positioned to record the presentation due to the disappearance of certain object characteristics. This embodiment would improve the appearance of the presentation on screen while decreasing manual operability. Such an approach can be considered recognition-based auto curation of media.

Another example includes sporting events. The inventive subject matter can be used to create an automatic camera switching system that improves viewership on display screens. For instance, during a baseball game, the initial video feed can come from a camera behind the pitcher's throw towards home plate. Upon recognizing the baseball, the delegation rules set can dictate what camera feed to immediately switch to according to what event subsequently takes place. For example, if the ball does not change in path, the camera does not delegate video functionality to another device. In contrast, if the ball is struck, the camera does delegate video capturing functionality to a camera behind home plate where the video feed will accommodate the ball's change in direction.

Another example includes construction management and supervision. In the construction field, engineers and contractors constantly must supervise large and dangerous construction areas on foot. Using the inventive subject matter, an engineer or contractor can more safely and conveniently supervise a site. Camera devices can be strategically placed throughout the construction site and construction vehicles. The onsite supervisor can then easily and safely obtain closer looks into tasks and hazardous areas by using a phone with an app to identify the strategically placed cameras on site. Upon the phone's recognition of the strategically placed cameras, the supervisor can easily delegate video or photo capturing to those cameras, which are in better view of what is at interest. Such media can then be relayed back to the supervisor's phone to be viewed without potentially moving into dangerous areas or getting in the way of other field employees.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A coordinated multi-device system, the system comprising:
   an object database storing object traits;
   a rules database storing at least one delegation rule set indexed according to at least some of the object traits; and
   a first media capturing device coupled with the object database and the rules database, and comprising an object recognition engine that is configured to:
      obtain media representative of an augmented reality environment;
      identify at least one object in the augmented reality environment as represented in the media;
      obtain object traits associated with the at least one object from the object database;
      select a delegation rules set as a function of the object traits associated with the at least one object from the object database; and
      delegate at least some media capturing functionality to a second media capturing device according to the delegation rules set,
      wherein the first media capturing device is further configured to select the delegation rules set based on a determination of whether the first media capturing device is located within a predetermined geo-fenced area.

2. The system of claim 1, wherein the object database comprises at least one of the following: a file system, a remote database, and a local database.

3. The system of claim 1, wherein the first media capturing device is configured to access the object database via a wireless connection.

4. The system of claim 1, wherein the rules database comprises at least one of the following: a file system, a remote database, and a local database.

5. The system of claim 1, wherein the object traits associated with the at least one object from the object database comprise at least one of the following: a physical trait, an emotional trait, a mental trait, a visual trait, a virtual trait, an audible trait, a behavior trait, a thermal trait, a textural trait, a scent trait, a taste trait, a chemical trait, a radioactive trait, a toxic trait, an energy trait, a biological trait, a biometric trait, a medical/health trait, a derived trait, and a geographic trait.

6. The system of claim 1, wherein the delegation rules set comprises at least one of the following: a performance command, a performance adjustment command, a stop command, a device setting adjustment, the second media capturing device's identity, a time shift command, a configuration parameter, a timing command, a triggering command, a play command, a relay command, an acknowledgement protocol, a negative acknowledgement protocol, and an authentication key.

7. The system of claim 1, wherein the first media capturing device comprises at least one of the following: a camera, a video camera, a webcam, an audio recorder, a scanner, a mobile phone, a telescope, binoculars, eye glasses, a smart phone, a computer, a printer, a tablet, a medical device, a kiosk, a game console, a vehicle, and a phablet.

8. The system of claim 1, wherein the second media capturing device comprises the same type of device as the first media capturing device.

9. The system of claim 1, wherein the media representative of the augmented reality environment comprises at least one of the following data modalities: image data, video data, audio data, speech data, motion data, acceleration data, temperature data, text data, biometric data, game data, radio data, webpage data, telecommunication data, satellite data, sensor data, ultrasonic data, x-ray data, MRI data, and CT scan data.

10. The system of claim 1, wherein the augmented reality environment comprises a real-world environment, wherein the real-world environment comprises at least one of the following: a nature setting, a building, a room, an operating room, a street, a stage, a vehicle, a road, an operating room, a school, a classroom, an arena, a stadium, a warehouse, a mall, a plaza, a neighborhood, an office, an ecosystem, infrastructure, a habitat, and a scene.

11. The system of claim 1, wherein the augmented reality environment comprises a virtual environment, wherein the virtual environment comprises at least one of the following: a virtual world, an augmented reality, a game, on-screen content, broadcast programming, and a mixed reality.

12. The system of claim 1, wherein the at least one object comprises at least one of the following: a tangible entity, an intangible entity, a virtual entity, an inanimate entity, and an animate entity.

13. The system of claim 1, wherein the object traits associated with the at least one object from the object database comprise a heterogeneous set of traits.

14. The system of claim 13, wherein the first media capturing device is further configured to select the delegation rules set based on the heterogeneous set of traits.

15. The system of claim 1, wherein the first media capturing device is further configured to select the delegation rules set based on a user selection of one or more delegation rules.

16. The system of claim 1, wherein the first media capturing device is further configured to select the delegation rules set based on a geographic location or geographic zone.

17. The system of claim 1, wherein the first media capturing device is further configured to select the delegation rules set based on a time duration that the first media capturing device captures media representative of the object.

18. The system of claim 1, wherein the first media capturing device is further configured to select the delegation rules set based on the type of device comprising the first media capturing device or the type of device comprising the second media capturing device.

19. The system of claim 1, wherein the media capturing functionality comprises at least one of the following: capturing an image, capturing a video, capturing audio, directing orientation for media capture, adjusting a media capturing setting, instructing document creation based upon second media capture, and requiring a media file format.

20. The system of claim 1, wherein the first media capturing device is further configured to receive an acknowledgement protocol or negative acknowledgement protocol.

21. The system of claim 1, wherein the object database is further configured to store object-specific links to delegation rules sets.

22. The system of claim 21, further comprising a network fabric comprising the first and the second media capturing device.

23. The system of claim 22, wherein the network fabric comprises at least one of the following types of networks: an ad hoc network, a peer-to-peer network, a personal area network, a wireless network, a local area network, a wide area network, metropolitan area network, server area network, system area network, campus area network, or desk area network.

24. The system of claim 1, further comprising the second media capturing device.

25. A coordinated multi-device method, the method comprising:
    storing object traits;
    storing at least one delegation rule set indexed according to at least some of the object traits;
        obtaining media representative of an augmented reality environment;
        identifying at least one object in the augmented reality environment as represented in the media;
        obtaining object traits associated with the at least one object;
        selecting a delegation rules set as a function of the object traits associated with the at least one object; and
        delegating at least some media capturing functionality to a second media capturing device according to the delegation rules set,
        wherein the first media capturing device is further configured to select the delegation rules set based on a determination of whether the first media capturing device is located within a predetermined geo-fenced area.

26. A computer program product embedded in a non-transitory computer-readable medium comprising instructions for coordinated multi-device operation, which, when executed, configure one or more computer processors to perform a method comprising:
    storing object traits;
    storing at least one delegation rule set indexed according to at least some of the object traits;
        obtaining media representative of an augmented reality environment;
        identifying at least one object in the augmented reality environment as represented in the media;
        obtaining object traits associated with the at least one object;
        selecting a delegation rules set as a function of the object traits associated with the at least one object; and
        delegating at least some media capturing functionality to a second media capturing device according to the delegation rules set, wherein the first media capturing device is further configured to select the delegation rules set based on a determination of whether the first media capturing device is located within a predetermined geo-fenced area.

27. A coordinated multi-device system comprising:

an object database storing object traits;

a rules database storing at least one delegation rule set indexed according to at least some of the object traits; and a first media capturing device coupled with the object database and the rules database, and comprising an object recognition engine that is configured to:
  obtain media comprising a motion data modality representative of an environment;
  identify at least one object in the environment as represented in the media;
  obtain object traits associated with the at least one object from the object database;
  select a delegation rules set as a function of the object traits associated with the at least one object from the object database; and
  delegate at least some media capturing functionality to a second media capturing device according to the delegation rules set,
  wherein the first media capturing device is further configured to select the delegation rules set based on a determination of whether the first media capturing device is located within a predetermined geo-fenced area.

* * * * *